No. 724,951. PATENTED APR. 7, 1903.
H. ROWNTREE.
AUTOMATIC ELECTRIC ELEVATOR.
APPLICATION FILED JUNE 28, 1901.
NO MODEL. 5 SHEETS—SHEET 1.
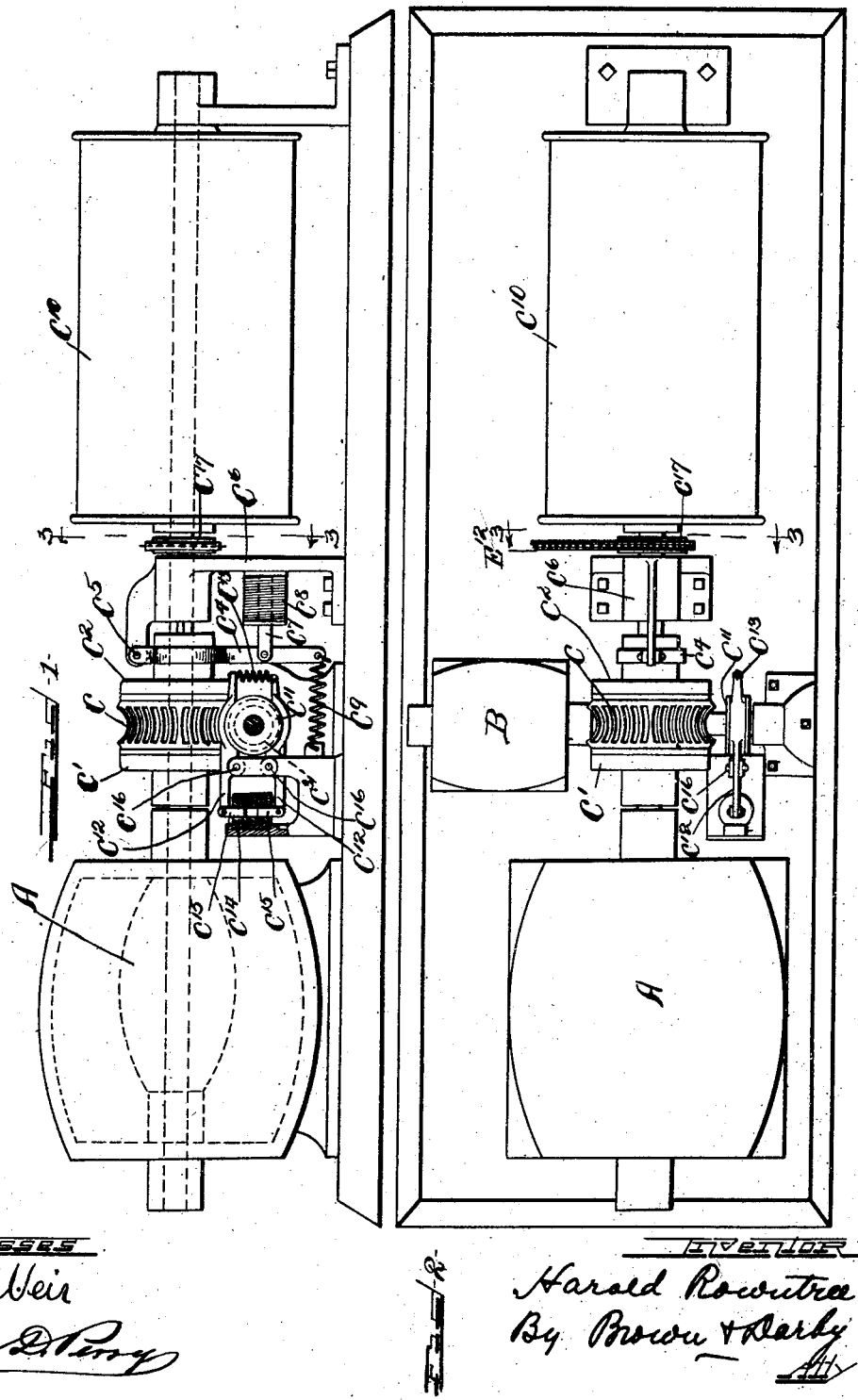

No. 724,951. PATENTED APR. 7, 1903.
H. ROWNTREE.
AUTOMATIC ELECTRIC ELEVATOR.
APPLICATION FILED JUNE 28, 1901.
NO MODEL. 5 SHEETS—SHEET 2.

Witnesses
J B Weir
Eva D. Perry

Inventor:
Harold Rowntree
By Brown & Darby
Attys

No. 724,951. PATENTED APR. 7, 1903.
H. ROWNTREE.
AUTOMATIC ELECTRIC ELEVATOR.
APPLICATION FILED JUNE 28, 1901.
NO MODEL. 5 SHEETS—SHEET 3.

Witnesses:
J. B. Weir
Ida D. Perry

Inventor
Harald Rowntree
By Brown & Darby
Attys.

No. 724,951. PATENTED APR. 7, 1903.
H. ROWNTREE.
AUTOMATIC ELECTRIC ELEVATOR.
APPLICATION FILED JUNE 28, 1901.
NO MODEL. 5 SHEETS—SHEET 4.

Witnesses
J. B. Weir
Ira D. Perry

Inventor
Harold Rowntree
By Brown & Darby
Attys

No. 724,951. PATENTED APR. 7, 1903.
H. ROWNTREE.
AUTOMATIC ELECTRIC ELEVATOR.
APPLICATION FILED JUNE 28, 1901.
NO MODEL. 5 SHEETS—SHEET 5.
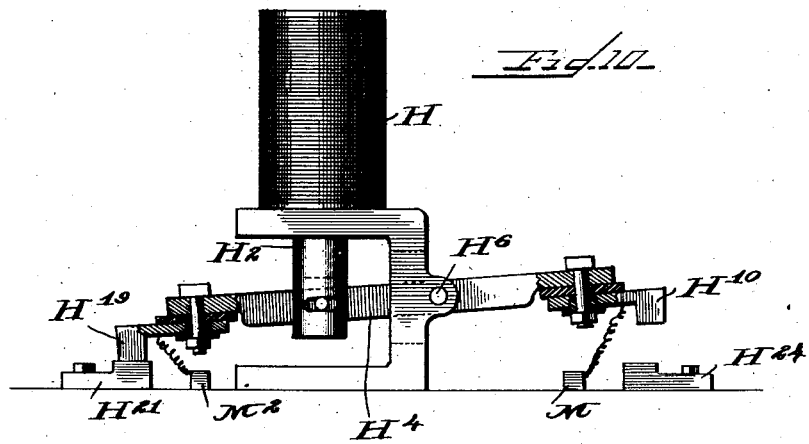
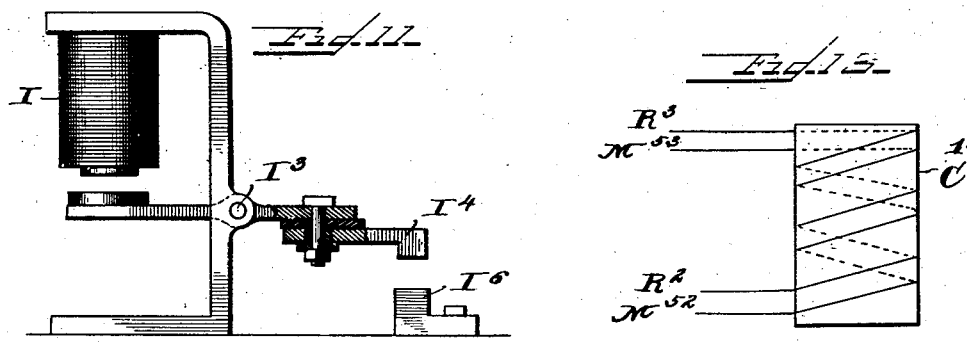
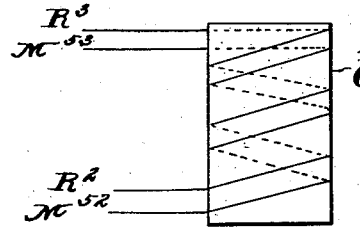
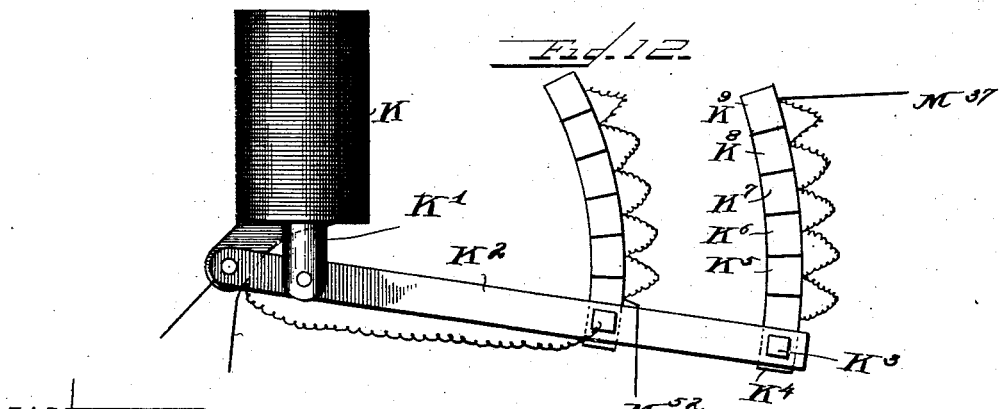
Witnesses:
Inventor:
Harold Rowntree
By Mason & Derby
Attys.

UNITED STATES PATENT OFFICE.

HAROLD ROWNTREE, OF CHICAGO, ILLINOIS, ASSIGNOR TO BURDETT-ROWNTREE MANUFACTURING COMPANY, OF CHICAGO, ILLINOIS, A CORPORATION OF ILLINOIS.

AUTOMATIC ELECTRIC ELEVATOR.

SPECIFICATION forming part of Letters Patent No. 724,951, dated April 7, 1903.

Application filed June 28, 1901. Serial No. 66,336. (No model.)

*To all whom it may concern:*

Be it known that I, HAROLD ROWNTREE, a citizen of the United States, residing at Chicago, in the county of Cook and State of Illinois, have invented a new and useful Automatic Electric Elevator, of which the following is a specification.

This invention relates to automatic electric elevators.

The object of the invention is to improve the construction of automatic electric elevators and to render the same more efficient in operation.

A further object of the invention is to provide a system of electric control for automatic elevators wherein the speed of travel of the car may be varied to suit the exigencies of use.

A further object of the invention is to provide a system of electrical control for elevator hoisting mechanism which is controllable from any landing.

Other objects of the invention will appear more fully hereinafter.

The invention consists, substantially, in the construction, combination, location, and arrangement of parts, all as will be more fully hereinafter set forth, as shown in the accompanying drawings, and finally pointed out in the appended claims.

Figure 3:
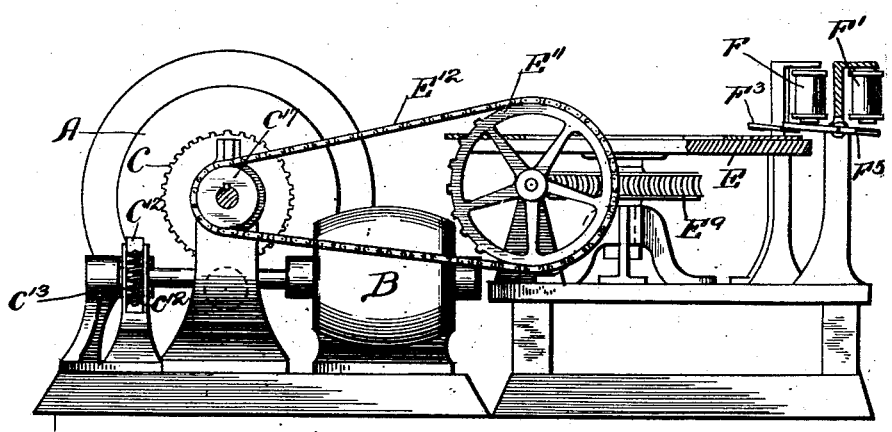
Figure 4:
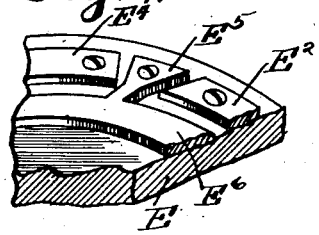
Figure 5:
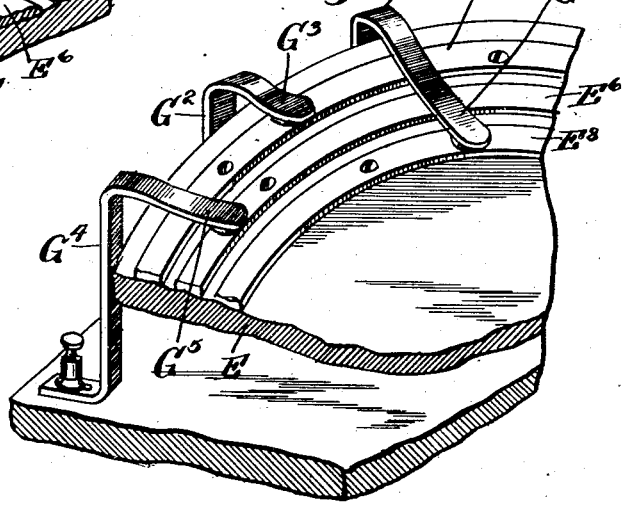
Figure 6:
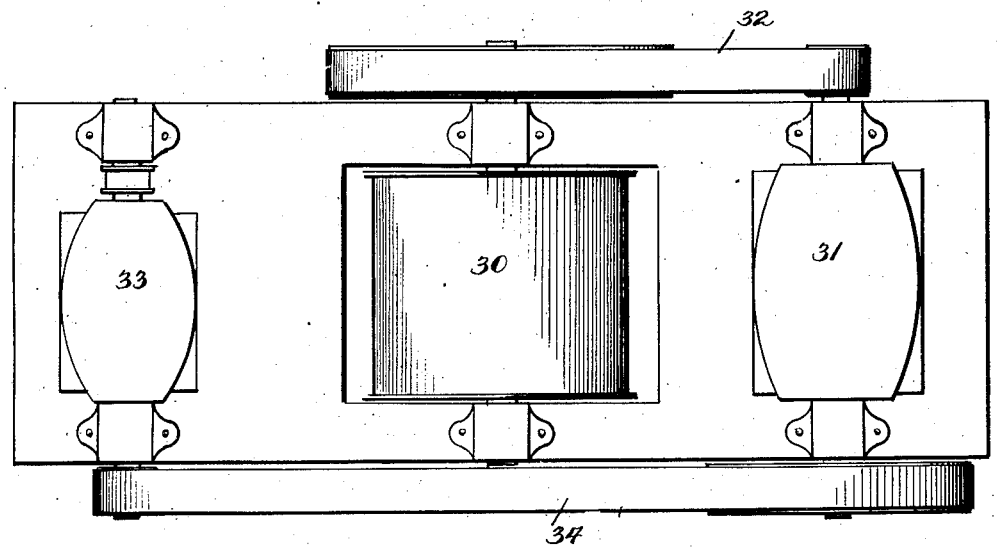
Figure 7:
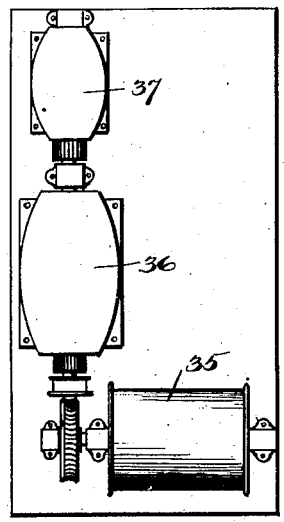
Figure 8:
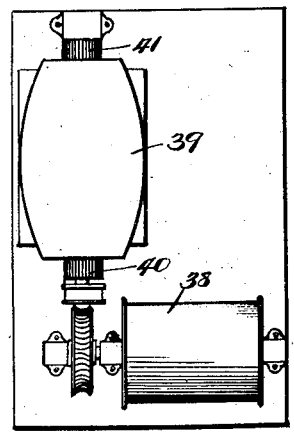
Figure 9:
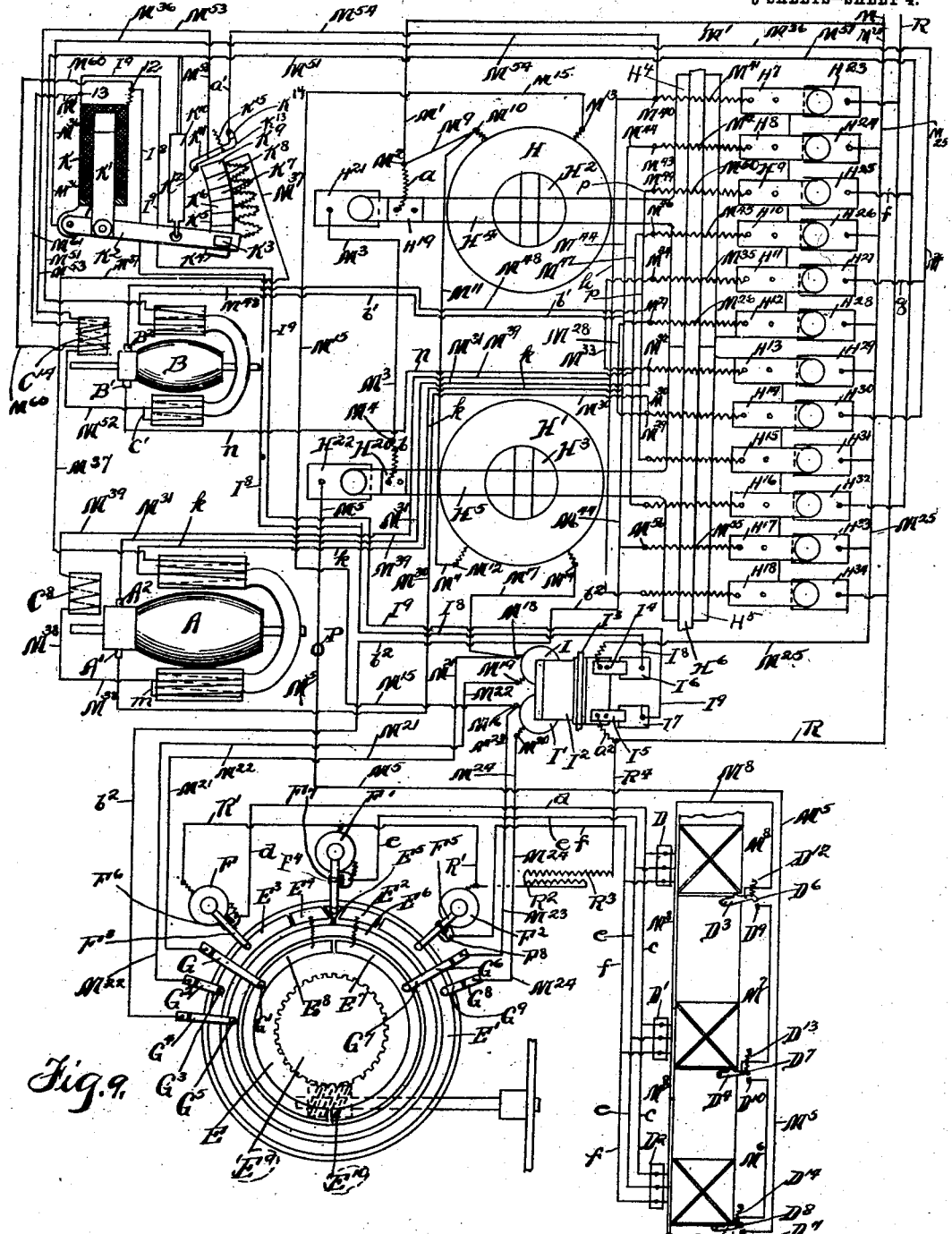

Referring to the accompanying drawings and to the various views and reference-signs appearing thereon, Figure 1 is a view in side elevation of a construction and arrangement of hoisting mechanism embodying the principles of my invention. Fig. 2 is a top plan view of the same. Fig. 3 is a view in section on the line 3 3 of Figs. 1 and 2 looking in the direction of the arrows and showing the movable contact-support and means for operating the same. Figs. 4 and 5 are respectively detached broken detail views in perspective of portions of the contact-support. Fig. 6 is a view in plan, somewhat diagrammatic, illustrating a modified arrangement of motors. Fig. 7 is a similar view showing an arrangement of motors in tandem. Fig. 8 is a similar view showing a form of motor having a set of windings for high speed and a set of windings for slow speed and embraced within the spirit and scope of my invention. Fig. 9 is a view in diagram, illustrating the arrangement of circuits employed in connection with my invention. Fig. 10 is a detail view in end elevation, parts in section, showing the construction and arrangement of contacts and operating devices therefor employed in connection with my invention. Fig. 11 is view similar to Fig. 10, showing the manner of mounting and operating other contacts employed in connection with my invention. Fig. 12 is a detail view, partly diagrammatic, illustrating a modified arrangement embodying the principles of my invention. Fig. 13 is a similar view in diagram, illustrating a modified arrangement of circuits.

The same part is designated by the same reference-sign wherever it occurs throughout the several views.

Reference-sign A designates a large motor, upon the shaft of which is loosely sleeved a worm-wheel C. Mounted upon the shaft of motor A in fixed relation to revolve therewith is a friction-plate C', and also mounted upon said shaft and keyed to rotate therewith, but capable of movement lengthwise thereof, is a second friction-plate $C^2$, the worm-gear C being arranged between said plates $C'$ $C^2$.

B designates a small or auxiliary motor, upon the shaft of which, as indicated in dotted lines in Fig. 1 at $C^3$, is mounted a worm arranged to mesh with worm-gear C upon the shaft of motor A. The clamping-disks $C'$ $C^2$ are normally held forced or pressed toward each other to clamp the worm-gear C therebetween, so as to secure rotation of said worm-gear coincident with the rotation of shaft of motor A; but by mounting one of said disks to slide endwise with respect to the shaft of said motor it will be seen that the friction or clamping engagement of said disks upon the worm-gear C may be relieved. The movable clamping disk or plate may be actuated in many different ways to effect the clamping engagement thereof or its release. In the particular form shown, to which, however, my invention is not limited or restricted, I employ a lever or strap $C^4$ and arrange the same to suitably engage the shiftable clamping-plate, said lever being pivoted, as at $C^5$, to a standard or bracket $C^6$ and a spring $C^9$ constantly exerting its tension upon lever $C^4$ to rock or move the same in a direction to effect a clamping of the worm-gear C between the clamping-plates $C'$ $C^2$. The lever $C^4$ may be rocked in the opposite direction in any suitable manner—as, for instance, by means of a solenoid $C^8$, the core or plunger $C^7$ of which being pivotally or otherwise connected to lever $C^4$. Thus it will be seen that when the solenoid $C^8$ is energized the clamping-plate $C^2$ is drawn away from the worm-gear C, and when said solenoid is deënergized the spring $C^9$ effects a clamping of the worm-wheel C between the friction clamping-plates $C'$ $C^2$, the tension of said spring being constantly exerted in a direction to effect the clamping of said worm-wheel between said friction or clamping plates.

Reference-sign $C^{10}$ designates the hoisting-drum, to which the hoisting-cables are attached in the usual way, and inasmuch as the manner of attachment of the hoisting-cables to the drums is familiar to persons skilled in the art I have not deemed it necessary to show such cables nor the car. The hoisting-drum $C^{10}$ may be connected to the shaft of motor A in many different ways, as will be explained more fully hereinafter. In the particular form shown in Figs. 1 and 2 said drum is mounted upon and keyed to rotate with the shaft of motor A.

Suitably keyed on the armature-shaft of motor B is a brake-wheel $C^{11}$. Suitably pivoted, as at $C^{16}$, are brake-arms $C^{12}$, arranged to engage the brake-wheel $C^{11}$. A spring $C^{13}$ normally operates to draw the brake-arms $C^{12}$ together and to apply the same to the brake-wheel to prevent the small or auxiliary motor B from revolving. The brake-arms may be released from engaging relation with respect to the brake-wheel in any suitable or convenient manner. I have shown as one form of means for accomplishing this result a solenoid $C^{14}$, having the movable cores or plungers $C^{15}$ thereof suitably connected with brake-arms $C^{12}$. The arrangement of the solenoid $C^{14}$ is such that when said solenoid is energized the brake-arms $C^{12}$ are rocked against the action of spring $C^{13}$ and are released from engaging relation with respect to the brake-wheel, and the instant the solenoid is deënergized the spring $C^{13}$ will effect an instant application of the brake-arms to the brake-wheel.

Reference-sign E designates what I shall term a "movable contact-support," which may be of any suitable construction and arrangement. In the particular form shown this support consists of a revolving disk, of slate or other suitable or convenient insulating material, and upon the top surface of which are mounted and suitably secured contact-pieces $E'$, $E^2$, $E^3$, $E^4$, $E^5$, $E^6$, $E^7$, and $E^8$. The support E may be mounted for movement in any suitable manner—as, for instance, said plate may be revolved from any convenient rotating part of the apparatus. For instance, in the particular form shown a worm-wheel $E^9$ is secured to said support and arranged to be engaged by a worm-gear $E^{10}$, driven from the shaft of drum $C^{10}$ in any convenient manner—as, for instance, by means of a sprocket-chain $E^{12}$ operating over sprocket-wheels $E^{11}$ and $C^{17}$, the latter being keyed on the shaft of motor A. Thus it will be seen that any rotation imparted to the hoisting-drum $C^{10}$ will be also transmitted to the contact-support E and the contact-pieces carried thereby. Associated with the contact-support are a series of magnets F $F'$ $F^2$, corresponding in number to the number of landings at which the car is designed to stop. The armatures $F^3$ $F^4$ $F^5$ of these magnets are pivotally mounted on castings $F^6$ $F^7$ $F^8$, with the projecting ends of said armatures arranged to extend immediately over the path of the contact-pieces $E'$ $E^2$ $E^3$ $E^4$ $E^5$. When any one of these magnets F, $F'$, or $F^2$ is energized, the end of its corresponding armature is brought into contacting relation with respect to one or another of the contact-points $E'$ $E^2$ $E^3$ $E^4$ $E^5$. If, for example, magnet F is energized, it attracts the armature $F^3$, thereby rocking said armature about its pivot, and hence causing the free end of said armature to be brought into contacting relation with respect to contact-piece $E^3$ when the support E is in the particular position shown in the drawings. As soon as the magnet is deënergized the free end of the armature is withdrawn from contact with said contact-strips.

Reference-signs G $G^2$ $G^4$ $G^6$ $G^8$ designate brackets suitably mounted upon a fixed part of the framework in position for the free ends $G'$ $G^3$ $G^5$ $G^7$ $G^9$, respectively, to make contact with various parts of the contact-strips on the support E. The gearing by which rotation is imparted to the contact-support E is so proportioned that when the car makes with a contact travel from one limit to the other the revolving support E will make less than one-half a revolution. The bracket G has its contact end $G'$ always in contact with the contact-strip $E^8$. The bracket $G^2$ has its contact end $G^3$ always in contact with the contact-strip $E^3$. Brackets $G^4$, $G^6$, and $G^8$ are similarly in constant contact with contact-pieces $E^6$, $E^7$, and $E'$, respectively. The contact-strip $E^6$ is in electrical connection, as clearly shown in Fig. 4, with the short contact-strip $E^5$, the contact-strip $E^8$ is in electrical connection with the short contact-strip $E^4$, and similarly the contact-strip $E^7$ is in electrical connection with the short contact-strip $E^2$. The magnets F $F'$ $F^2$ are so relatively placed that when the car is at or on a level with the top floor—that is, is at its extreme upper limit of travel—the contact-piece $E^5$ will be centrally under the free end of armature $F^3$, and when the car is at the middle floor or landing—that is, is at a point intermediate or half-way from the extreme limits of its travel—the contact-strip $E^5$ will be centrally under the free end of the armature $F^4$, and when the car is at the bottom floor—that is, is at its other extreme limit of travel—the contact-strip $E^5$ will be centrally under the free end of the armature $F^5$. I am assuming that the car only stops at three landings—an upper, a lower, and an intermediate landing, as shown in the drawings. (See Fig. 9.) If, however, there are a greater number of landings at which the car is designed to stop, a magnet corresponding to F F' $F^2$ is provided for each floor or landing and the contact-strip $E^5$ is brought into central relation under the free end of the armature of the particular magnet corresponding to each particular floor or landing-place.

Reference-signs H and H' (see Fig. 9) designate solenoids having the cores or plungers $H^2$ $H^3$ thereof respectively connected to levers $H^4$ $H^5$. These levers are loosely sleeved on a shaft $H^6$, and on the opposite side of the pivot-shaft $H^6$ from the solenoids H H' said levers $H^4$ $H^5$ carry a series of contact-points insulated from each other and from the levers in any convenient manner. In the particular form shown each lever $H^4$ $H^5$ is thus provided with six contact-points, said contact-points carried by lever $H^4$ being designated by reference-signs $H^7$, $H^8$, $H^9$, $H^{10}$, $H^{11}$, and $H^{12}$ and the contact-points carried by lever $H^5$ being designated, respectively, by reference-signs $H^{13}$, $H^{14}$, $H^{15}$, $H^{16}$, $H^{17}$, and $H^{18}$. Carried by the opposite free ends of levers $H^4$ $H^5$ are contacts $H^{19}$ $H^{20}$, suitably insulated from said levers and respectively coöperating with contact-points $H^{21}$ $H^{22}$. When the solenoid H is energized, the plunger or core $H^2$ thereof is raised and the contact $H^{19}$ is moved out of contacting relation with respect to contact $H^{21}$, and at the same time the contacts $H^7$, $H^8$, $H^9$, $H^{10}$, $H^{11}$, and $H^{12}$ are brought respectively into contact with coöperating contacts $H^{23}$, $H^{24}$, $H^{25}$, $H^{26}$, $H^{27}$, and $H^{28}$, and when said solenoid is deënergized circuit between the contacts $H^7$, $H^8$, $H^9$, $H^{10}$, and $H^{11}$, and $H^{12}$ and the series $H^{23}$, $H^{24}$, $H^{25}$, $H^{26}$, $H^{27}$, and $H^{28}$, respectively, are broken and circuit is made or reëstablished between contacts $H^{19}$ and $H^{21}$. Similarly when solenoid H' is energized circuit is broken between contacts $H^{20}$ and $H^{22}$ and completed between the series of contacts $H^{13}$, $H^{14}$, $H^{15}$, $H^{16}$, $H^{17}$, and $H^{18}$ and a coöperating series of contacts $H^{29}$, $H^{30}$, $H^{31}$, $H^{32}$, $H^{33}$, and $H^{34}$, respectively, and when said solenoid H' is deënergized or the circuit thereof broken circuit is broken between the series of contacts $H^{13}$ to $H^{18}$ and the coöperating series $H^{29}$ to $H^{34}$, respectively, and circuit is completed or reëstablished between contacts $H^{20}$ and $H^{22}$.

Reference-signs I I' designate two small magnets, both of which operate upon the same armature $I^2$. This armature is pivotally mounted, as at $I^3$, and upon the opposite side of said pivot-point said armature is provided with contact-pieces $I^4$ $I^5$, respectively arranged to make and break contact with coöperating contact-pieces $I^6$ $I^7$. If, therefore, either of the magnets I or I' is energized, the contact-piece $I^4$ will complete circuit with its coöperating contact-piece $I^6$ and contact-piece $I^5$ will complete circuit with its coöperating contact-piece $I^7$, and as soon as the magnets I I' are deënergized the above-mentioned pairs of contacts will be broken.

Reference-sign K designates a solenoid, to the movable core or plunger K' of which is connected a rheostat-arm $K^2$, said arm being pivotally mounted upon a convenient fixed part of the frame. The rheostat-arm carries a contact $K^3$, arranged to operate over the rheostat-segments $K^4$ $K^5$ $K^6$ $K^7$ $K^8$ $K^9$ whenever the circuit of the solenoid K is completed. A dash-pot $K^{10}$ may serve the purpose of limiting the speed of movement of the rheostat-arm.

Reference-sign $K^{11}$ designates a pivoted lever provided with a toe or heel $K^{12}$, arranged in the path of rheostat-arm $K^2$, so that when said rheostat-arm is in its extreme limit of movement in one direction it engages said heel and rocks said lever $K^{11}$ to carry a contact $K^{13}$ out of contact with a coöperating contact $K^{14}$. As soon as the rheostat-arm moves toward the opposite limit of its travel a spring $K^{15}$ immediately reëstablishes the contacting relation of contacts $K^{13}$ and $K^{14}$.

In Fig. 9 I have shown diagrammatically the arrangement of push-button-control circuits for the various floors or landings and the coöperating door-switches. As above indicated, any number of doors or landings may be similarly arranged; but I have shown as illustrative of the principles involved the arrangement as applied to three doors or landings. A push-button plate D D' $D^2$ is arranged at each floor or landing, preferably in convenient position adjacent to each doorway. Each push-button plate contains as many push-buttons as there are landings or floors at which the car is designed to stop. For instance, in the particular form shown each push-button plate is provided with three push-buttons, which may be referred to as the upper, middle, and lower push-button in each case. A door-switch is also arranged at each landing, and each door-switch comprises a lever $D^3$ $D^4$ $D^5$. The ends $D^6$ $D^7$ $D^8$ of these switch-levers are arranged to coöperate with adjacent contact-points $D^9$ $D^{10}$ $D^{11}$, respectively. Springs $D^{12}$ $D^{13}$ $D^{14}$ operate to normally hold the door-switches $D^3$ $D^4$ $D^5$, respectively, out of contacting relation with their coöperating contact-points $D^9$ $D^{10}$ $D^{11}$, and the switch-levers are so relatively arranged with respect to the doors that when the door is closed the door-switch lever is rocked against the action of its retractile to complete circuit with its coöperating contact. Thus if any door is opened its corresponding switch is also opened, and when any door is closed its corresponding switch is also closed.

I will now explain the circuit connections of the apparatus above described, referring to Fig. 9. The main supply-wire M leads to a suitable source of current and connects by wire M' to binding-post M², thence to contact-point H¹⁹, through wire $a$, thence to contact H²¹, wire M³, binding-post M⁴, wire $b$, contact-piece H²⁰, contact-piece H²², wire M⁵, a lamp P, to contact-return D¹¹, contact end D⁸, wire M⁶, contact D¹⁰, contact D⁷, wire M⁷, contact D⁹, contact D⁶, wire M⁸, which feeds the several push-buttons in the various push-button plates D D' D². If, therefore, the circuit so far traced is broken at any point—as, for instance, between contacts H¹⁹ H²¹, or contacts H²⁰ H²², or the contacts D⁸ D¹¹, or D⁷ D¹⁰, or D⁶ D⁹—the circuit feeding the push-button plates is broken. I will now continue the tracing of this circuit from the upper push-button of each push-button plate. It will be seen that each upper push-button of each push-button plate serves to bridge the circuit from wire M⁸ to a wire $c$, which connects, by means of a wire $d$, to the casting F⁶ of magnet F. Similarly the next push-button in each push-button plate bridges and controls the circuit from wire M⁸ to a wire $e$, which connects with the casting F⁷ of magnet F', and the lowermost push-button of each push-button plate controls the circuit connection from wire M⁸ to wire $f$ and thence to the casting F⁸ of magnet F², and so on for all the magnets F F' F² and all the push-buttons. The return-wires from each of these magnets F F' F² are joined together to wire R', which is connected by wire R² to a resistance R³, and from this resistance the circuit proceeds through wire R⁴ to main return-wire R. The supply-wire M' also feeds wire M⁹ through binding-post M² to binding-post M¹⁰. This binding-post is connected by wire M¹¹ to binding-post M¹². The binding-post M¹⁰ is connected to one terminal of solenoid H, the other terminal of said solenoid being connected to binding-post M¹³. The binding-post M¹² is similarly connected to one terminal of solenoid H', the other terminal of said solenoid being connected to binding-post M¹⁴. The binding-post M¹³ connects, through wire M¹⁵, to binding-post M¹⁶ of magnet I', and the binding-post M¹⁴ connects, by wire M¹⁷, to binding-post M¹⁸ of magnet I. One terminal of magnet I is connected to binding-post M¹⁸ and the other terminal of said magnet is connected to binding-post M¹⁹. One terminal of magnet I' is connected to binding-post M¹⁶ and the other terminal is connected to binding-post M²⁰. From binding-post M¹⁸ wire M²¹ connects to bracket G. From binding-post M¹⁹ wire M²² connects to bracket G². From binding-post M¹⁶ wire M²³ connects to bracket G⁶. From binding-post M²⁰ wire M²⁴ connects to bracket G⁸.

I will now explain the wiring for the motors: From the main supply-wire M, through wire M²⁵, is connected each of the contact-pieces H²⁴, H²⁶, H²⁸, H²⁹, H³¹, and H³³. Suppose the solenoid H is energized and the contact-lever H⁴ is rocked to cause electrical connection between the contacts H⁷ H²³, H⁸ H²⁴, H⁹ H²⁵, H¹⁰ H²⁶, H¹¹ H²⁷, and H¹² H²⁸. Thereupon the motor-circuits are completed from wire M²⁵ to contact H²⁸, contact H¹², wire M²⁶, binding-post M²⁷, wire M²⁸, binding-post M²⁹, wire M³⁰, armature-brush A' of the large motor A, through the armature of said motor to brush A², wire M³¹, binding-post M³², wire M³³, binding-post M³⁴, wire M³⁵, contact H¹¹, contact H²⁷, wire $g$, wire M³⁶, rheostat-arm K², contact-brush K³, segment K⁴, all the resistances of the rheostat to segment K⁹, wire M³⁷, the series field-windings of large motor A, wire M³⁸, solenoid C⁸ of the friction-clutch, wire M³⁹, wire $h$, binding-post M⁴⁰, wire M⁴¹, contact H⁷, contact H²³, and return-wire R. Thus the main motor will start up with the armature and series field-windings in a circuit containing all the resistance of the rheostat. Current will also pass from main supply-wire M to wire M²⁵, to contact H²⁴, contact H⁸, wire M⁴², binding-post M⁴³, wire M⁴⁴, wire $k$, the shunt field-windings of motor A, joining wire M²⁸ at $m$, thence on through solenoid C⁸, wire M³⁹, wire $h$, binding-post M⁴⁰, wire M⁴¹, contact H⁷, contact H²³, and wire R to return. This completes the circuits of the large motor. At the same time the circuits of the small motor are completed as follows: from main supply-wire M to wire M²⁵, contact H²⁶, contact H¹⁰, wire M⁴⁵, binding-post M⁴⁶, wire M⁴⁷, wire $n$, armature-brush B' of motor B, through the armature of said motor to armature-brush B², wire M⁴⁸, wire $p$, binding-post M⁴⁹, wire M⁵⁰, contact H⁹, contact H²⁵, wire $f$, wire M⁵¹, the series field-windings of motor B, wire M⁵², solenoid C¹⁴ of the brake of the small motor, wire M⁵³ to switch-lever K¹¹, contact-piece K¹³, contact K¹⁴, wire $a'$, wire M⁵⁴ to binding-post M⁴⁰, wire M⁴¹, contact H⁷, contact H²³ to return-wire R. The current will also pass from main supply-wire M, through wire M²⁵, contact H²⁴, contact H⁸, wire M⁴², binding-post M⁴³, wire M⁴⁴, wire $b'$ to the shunt field-windings of the small motor B, joining the series field-circuit of said motor at $c'$, thence by wire M⁵², solenoid C¹⁴, wire M⁵³, switch-lever K¹¹, contact K¹³, contact K¹⁴, wire $a'$, wire M⁵⁴, binding-post M⁴⁰, wire M⁴¹, contact H⁷, contact H²³ to return-wire R.

From the above it will be seen that when the solenoid H is energized all the connections to the two motors are completed to operate the motors in one direction. In the same manner the circuits controlled by solenoid H' effect an operation of the motors in the other direction. Thus when the solenoid H' is energized the connections are so completed that both motors will operate in the reverse direction to that above described, and I do not consider it necessary to trace out in detail the reversing-circuits, the complete reversing-circuits, however, being fully shown in the drawings. When the motors are started up in one direction—as, for instance, when the solenoid H is energized—the small motor B starts immediately at full speed, there being no resistance in the circuits of said motor, and inasmuch as the brake-solenoid $C^{14}$ is included in the field-circuit of said motor B the completion of said circuit effects an energization of solenoid $C^{14}$ and which results in the instant liberation of the brake by said solenoid. It will also be seen that the large motor A is also energized, as is also the solenoid $C^8$ of the friction-brake, which is included in the circuits of the field of motor A; but the current passing through motor A and said solenoid $C^8$ is so restricted by the resistances of the rheostat, which is also included in the series field-circuit of said motor A, that only a feeble pull is exerted by the motor, and the solenoid is not energized sufficiently to withdraw the friction-plates $C^2$ from the worm-wheel C. Consequently said worm-wheel C remains clamped upon the shaft of motor A between the clamping-plates $C'$ $C^2$. Therefore the car-hoisting drum is being operated at a slow speed by the small motor. As will be explained more fully hereinafter, as soon as the motors are started the rheostat-arm $K^2$ begins to move under the influence of the energization of solenoid K. The actuation of the rheostat-arm $K^2$ effects a gradual cutting out of the resistance in the circuits of motor A and of solenoid $C^8$, included in such circuits, thereby not only increasing the pull of motor A, but also effecting a gradual releasing of the friction clamping-plates $C'$ $C^2$ from engaging or clamping relation with respect to worm-wheel C, and hence allowing the increased pull of the motor A to gradually assume the work of operating the shaft of hoisting-drum $C^{10}$ faster than the worm-wheel C is operated by the small motor B. By the time the rheostat-arm $K^2$ reaches the limit of its movement under the influence of the energization of its actuating-solenoid K the motor A is operating at its full strength and speed, because the resistance included in the circuits thereof will have been cut out and the friction-plate $C^2$ will have been liberated entirely from the worm-wheel C by the action of solenoid $C^8$. When this point is reached, it will be seen that the small motor B is no longer doing any useful work, and hence said motor may be cut out of circuit. This cutting out is effected by the rheostat-arm $K^2$ engaging the heel $K^{12}$ of switch-lever $K^{11}$ and rocking said lever, thereby breaking the small-motor circuits between the contact-points $K^{13}$ $K^{14}$. The breaking of this circuit not only breaks the circuits of the small motor B, but also of solenoid $C^{14}$, thereby effecting an application of the brake-arms $C^{12}$ and stopping the said auxiliary or small motor. When the car approaches a stopping-point and before such stopping-point is reached, the solenoid K is deënergized by means which will presently be more fully explained, thereby permitting the return of the rheostat-arm $K^2$ to its initial position. The first result of the movement of rheostat-arm $K^2$ toward initial position is to permit switch-lever $K^{11}$ to again close the contact-points $K^{13}$ $K^{14}$ upon each other, thereby reëstablishing the circuits of the auxiliary or small motor B and starting said motor and also releasing the small or auxiliary motor brake. As the rheostat-arm continues its movement toward initial position resistance is gradually cut into the circuits of the large motor A and of solenoid $C^8$, thereby decreasing the speed and the pull of motor A and at the same time allowing the friction-plate $C^2$ to be again applied to clamp worm-wheel C with increasing force as the pull of the solenoid $C^8$ becomes less and less. The speed, therefore, of the hoisting-drum $C^{10}$, and hence of the car, is thus decreased by the application of the resistance in the circuits of the main motor A and by the application of the friction-plate $C^2$ on the worm-wheel C, thereby rapidly cutting down the speed of the armature-shaft of motor A. Thus the friction-plate $C^2$ acts as an ordinary brake on electric elevators, with this difference, that the ordinary elevator-brake brings the car to an absolute rest, whereas in the present instance the action of the brake or friction-plate $C^2$ is to bring the speed of the shaft of motor A down to the speed at which the worm-wheel C moves under the actuation of the small or auxiliary motor. Consequently the small motor B, which is again put in action by the switch $K^{11}$, as above explained, continues to move the drum $C^{10}$ at a slow speed until the desired stopping-point is reached. When this point is reached, the circuit of solenoid H is broken, said solenoid is deënergized, and the switch-contacts $H^7$ $H^{23}$, $H^8$ $H^{24}$, $H^9$ $H^{25}$, $H^{10}$ $H^{26}$, $H^{11}$ $H^{27}$, and $H^{12}$ $H^{28}$ are opened, thereby breaking the contacts with both motors, applying the brake to the small or auxiliary motor shaft, and stopping the car. Thus it will be seen that in starting the car starts up slowly and easily by means of the small motor, and the speed is then increased to a high speed through the large motor being brought into action, and in slowing down the reverse action will take place, the large motor having its speed greatly decreased and the small motor being again put into working connection with the drum and the circuits of both motors being finally cut out when the desired stopping-point is reached.

I will now explain the application of the push-button control, whereby the above operations are rendered automatic to start the car and to stop the same at any predetermined stopping-point.

As above explained, when any one of the push-buttons is operated, the circuit of its corresponding magnet F F' $F^2$, &c., is completed. For instance, if the top push-button of any series or at any floor is manipulated the circuit of magnet F is completed and said magnet is energized. Thereupon a circuit will be completed as follows: from the main supply-wire M through wire M' to binding-post $M^2$, wire $a$, contacts $H^{19}$ $H^{21}$, wire $M^3$, binding-post M$^4$, wire $b$, contact H$^{20}$, contact H$^{22}$, wire M$^5$, which includes lamp P, contact D$^{11}$, contact D$^5$, wire M$^6$, contact D$^{10}$, contact D$^7$, wire M$^7$, contact D$^9$, contact D$^6$, wire M$^8$, the upper push-button in the upper plate, for instance, to wire $d$, the windings of magnet F, wire R′, wire R$^2$, resistance R$^3$, wire R$^4$ to return-wire R. This energizes magnet F and causes the free end of the armature-lever F$^3$ thereof to be brought into contact with contact-strip E$^3$. The instant this contact is made the following circuit is completed: from the main supply-wire M, wire M′, binding-post M$^2$, wire M$^9$, binding-post M$^{10}$, wire M$^{11}$, binding-post M$^{12}$, solenoid H′, binding-post M$^{14}$, wire M$^{17}$, binding-post M$^{18}$, magnet I, binding-post M$^{19}$, wire M$^{22}$, bracket G$^2$, contact G$^3$, contact E$^3$, armature-lever F$^3$, hinge or stand F$^6$, magnet F, wire R′, wire R$^2$, resistance R$^3$, wire R$^4$ to the return. The circuits of solenoid H′ and of magnet I are thus completed, and said solenoid and magnet are energized. The energization of solenoid H′ closes the circuits for both motors to cause the car to travel toward the upper floor. The starting up of the motors also begins a revolving movement of the contact-support E, to cause contact-piece E$^5$ thereon to move toward the end of armature-lever F$^3$. At the same time the energization of magnet I will close the circuit of rheostat-solenoid K, as follows: from the main supply-wire M, through wire M$^{25}$ to contact-piece I$^4$, contact I$^6$, wire I$^8$ to binding-post 12, the windings of solenoid K to binding-post 13, wire I$^9$, contact I$^7$, contact I$^5$, wire $a^2$ to main return-wire R. Whenever, therefore, either of the magnets I or I′ are energized, the solenoid K is energized and the rheostat-arm is moved thereby. The instant the magnets I I′ are both deënergized the circuit of solenoid K is broken and the solenoid-arm is permitted to return to its initial position. As soon, therefore, as the upper button is pressed the switches are closed and the small motor starts the car slowly and easily. The large motor A also has its circuits completed, and the action of the rheostat steadily increases or strengthens the pull of the large motor A and at the same time gradually releases friction-plate C$^2$ from contact or clamping relation with respect to worm-wheel C. As the car proceeds the revolving contact-support E brings the contact-piece E$^5$ thereon nearer and nearer to the contacting end of said armature-lever F$^3$. As soon as the contacting end of armature-lever F$^3$ reaches contact-strip E$^4$ the circuit, which I have just described as being completed for solenoid H′ and magnet I and the magnet F, is now changed so that it no longer passes through the magnet I, and is as follows: from main supply-wire M, wire M′, binding-post M$^2$, wire M$^9$, binding-post M$^{10}$, wire M$^{11}$, binding-post M$^{12}$, solenoid H′, binding-post M$^{14}$, wire M$^{17}$, binding-post M$^{18}$, and from there on, instead of following the circuit above traced through magnet I, it will pass through wire M$^{21}$ to stand G, the contacting end G′ thereof, contact-strip E$^8$, contact-piece E$^4$, the end of armature-lever F$^3$, hinge F$^6$, magnet F, wire R′, wire R$^2$, resistance R$^3$, wire R$^4$ to return R. The instant, therefore, that the contacting end of armature F$^3$ reaches the contact-piece E$^4$ the current is short-circuited across or around magnet I, thereby deënergizing said magnet. This immediately breaks the circuit of the solenoid K and permits the rheostat-arm to return toward its initial position, as before explained, and to effect a slowing down of the speed of the car to the speed thereof due to the operation of the auxiliary or small motor B. As the hoisting-drum C$^{10}$ continues to revolve the revolving contact-support E eventually brings contact-strip E$^5$ thereon into contacting relation centrally under the contacting end of armature F$^3$. When this contact is effected, the following circuit is completed: from the main supply-wire M, wire M$^{25}$, contact H$^{33}$, contact H$^{17}$, wire M$^{55}$, binding-post M$^{56}$, wire M$^{44}$, wire $b^2$, to bracket G$^4$, the contacting end G$^5$ thereof, contact ring or strip E$^6$, contact E$^5$, the end of armature-lever F$^3$, contact-stand F$^6$, magnet F, wire R′ to return, as before. The instant this occurs the current instead of traversing the circuit which includes solenoid H′ will traverse the path of least resistance, and hence instead of the current flowing from main supply-wire M and wire M′ through the circuit of solenoid H′ will flow through wire M$^{25}$ and on, as above described, through stand G$^4$, strip E$^6$, strip E$^5$, lever F$^3$, magnet F, and return through wires R′ R$^2$, resistance R$^3$, wire R$^4$ to return R. Consequently solenoid H′ is immediately deënergized, thereby opening all the switches H$^{13}$ H$^{14}$ H$^{15}$ H$^{16}$ H$^{17}$ H$^{18}$, with their coöperating contact-pieces H$^{29}$ H$^{30}$ H$^{31}$ H$^{32}$ H$^{33}$ H$^{34}$, and breaking both motor-circuits and also breaking the circuit that is now feeding the magnet F through the resistance R$^3$ by breaking of contacts H$^{17}$ H$^{33}$. These contacts being broken, the circuit is also broken and magnet F is deënergized. The contacting end of the armature F$^3$ of said magnet is therefore released from contact with the contact-piece E$^5$, and all circuits are therefore broken. It will be noted that the feed-wire for feeding the circuits of the push-buttons passes through the contacts H$^{19}$ H$^{21}$ and the contacts H$^{20}$ and H$^{22}$. The circuit between these contacts is completed whenever the solenoids are not energized and break the push-button circuits when either one of said solenoids is energized. If, therefore, either solenoid is energized, the circuit to the push-buttons is broken and the push-buttons are rendered inoperative until the solenoids are again deënergized and the car stopped. If, therefore, the car is in motion, the operation of any one of the push-buttons will be without effect. Moreover, it will be seen that the door-switches are also included in this circuit, and consequently if any door is open the car cannot be started. It may sometimes occur that in going up or down the car by its momentum may travel a few inches beyond the exact point at which it is to stop, or this may be due to the slip on the brake of the small motor. In order to correct this, the contact-piece $E^5$ is made in triangular shape and the magnet-switches may be suitably adjusted or moved, so as to bring the contacting ends of the armature-levers thereof nearer to or farther from the edge of the supporting-plate E, so as to make contact with strip $E^5$ a little sooner or a little later when going in either direction, as may be found necessary or desirable in practice, to allow for more or less slip on the brake or more or less momentum of the moving parts, thereby stopping the car at exactly the same spot in either direction.

I have in the foregoing description referred to a lamp P being included in the push-button circuit. The object of this is to prevent the full current strength from passing through the push-button circuits to magnets F F' $F^2$ and return when the push-button circuit is completed, the lamp serving the purpose of limiting the amount of current passing through the push-buttons. It will be noticed that as soon as the push-button circuit is completed current will pass through its corresponding magnet F F' $F^2$ and thence through resistance $R^3$ to return. This completes another circuit, as above explained, by means of which more current passes through the circuit of the magnets F F' $F^2$, as the case may be, through the circuit of solenoids H or H' on the small magnets I or I'. It is desirable, therefore, that the current of the push-button circuits should not charge the corresponding magnet F F' $F^2$ or resistance $R^3$ to its full capacity. Consequently the lamp is placed in the push-button circuit to limit the current passing therethrough. Thus the lamp limits the current through the push-button circuits, and the solenoids H H' limit the current passing through the circuit which includes said solenoids, and the resistance $R^3$ limits the final short-circuit current which passes only through one of the small magnets I I'. In practice the resistance $R^3$ may be applied in different ways—as, for instance, an independent resistance, as shown. It is obvious, however, that this resistance may be secured in other ways—as, for instance, in a winding of solenoid $C^{14}$ in shunt instead of in series, said shunt being fed through wire $R^2$. In other words, the resistance-wire $R^3$ may in practice be wrapped around the solenoid $C^{14}$, thereby answering the double purpose of furnishing the necessary resistance to the circuits of magnets I I' when needed and also energizing the solenoid $C^{14}$. It is obvious that the solenoid $C^{14}$ may be compound wound, so that it may have the series winding, as above explained, and also a shunt-winding acting as a resistance $R^3$.

In the foregoing description I have referred to a winding of brake magnet or solenoid $C^{14}$ as being in series with the armature and series field-windings of small motor B. An auxiliary winding of the brake-magnet may be included in a shunt circuit around rheostat K, as indicated by wires $M^{60}$ $M^{61}$. The object of this is that when it is desired to commence to slow down the car an additional and desirable slowing-up effect may be produced by partially applying the brake, the amount of application of the brake being in inverse proportion to the amount of current flowing through the armature of the motor. This result is obtained by breaking the shunt-circuit of the brake magnet or solenoid at the same instant that the circuit of the rheostat magnet or solenoid is broken. This leaves the energization of the brake magnet or solenoid dependent upon the amount of current flowing through the armature of the small motor. If, therefore, the motor is lifting a heavy load, there will be sufficient current passing through the winding of the brake-solenoid to withhold it from action; but if the car is lowering a load there will be but little current passing through the brake-solenoid and it will be partially applied. As soon as the circuits are entirely broken the brake is fully applied. It will be seen that the shunt brake-circuit insures that the brake is withheld from application during the actual running period and is cut out only when the slowing up is desired to commence. The brake, therefore, will be withheld regardless of the work being done by the motor during the actual running period; but during the slowing-up period the brake will be partially applied, the amount of application being in inverse proportion to the work being done by the motor, and the brake will be fully applied when all circuits are broken and the stopping-point is reached. Consequently the brake is only partially applied as the car approaches its stopping-point and is completely applied only when the circuit is entirely broken. The result is that the amount of slowing up effected is proportioned to the amount of slowing-up effect needed and a more accurate stop regardless of the load is produced.

It will be noticed in the foregoing description and in the appended claims that the motors are referred to as a "high-speed" motor and a "slow-speed" motor or as a "large" motor and a "small" motor. The question of speed has no reference to the speed at which the motor itself revolves, but refers entirely to the speed at which the motor operates the car, the object of one motor being to operate the car at a high speed and the object of the other motor being to operate the car at a slow speed.

From the foregoing description it will be seen that the hoisting-drum is operated by a motor at a high speed. It will also be seen that an auxiliary motor is provided for operating said drum at a slow speed and that means are provided for automatically shifting the load from the one motor to the other.

It will also be seen that this automatic shifting of the load from one motor to the other occurs or takes place to reduce the speed of travel of the car as the car approaches a predetermined stopping-point and also to increase the speed of travel of the car as the car starts on its travel. It will also be seen that provision is made whereby when the car is operating at full speed under the high-speed motor the slow-speed or auxiliary motor is entirely snapped or cut out of circuit and that the speed of the car is reduced by varying the armature-circuits of the high-speed motor. These principles may be applied in many specifically-different constructions and arrangements of motors, and I have described a construction and arrangement of motors as shown in Figs. 1, 2, and 3 wherein the hoisting-drum is mounted directly upon the armature-shaft of the high-speed motor A, and the auxiliary motor B is detachably geared to said shaft, with means whereby the power may be gradually shifted from the one motor to the other. In Fig. 6 I have shown a modified arrangement embodying the same principles and adapted for the method of push-button control such as above described, wherein the hoisting-drum 30, instead of being mounted directly upon the shaft of the high-speed motor 31, is geared or belted to the shaft of said motor, as indicated at 32, and instead of the auxiliary or slow-speed motor 33 being detachably geared to the shaft of the hoisting-drum said motor is belted or geared, as at 34, to the shaft of the high-speed motor. From this arrangement it will be seen that whenever the car is in motion both motors are in operation, the small motor not being disconnected at any time from the high-speed motor. The operations of the push-button circuits, solenoids, revolving contact carrier or support, auxiliary-magnet switches, and rheostat are exactly the same as above described, and current is supplied to the high-speed motor through the rheostat, as before. It is only necessary that one brake-solenoid instead of two be employed, as the auxiliary motor is not disconnected, and the solenoid that is used fulfils its normal purpose by holding off the brake while the car is in motion. When the rheostat-arm is in its normal or retracted position, the small motor will be running at its normal speed with full strength and the large motor will be running at the speed at which it is driven by the gear or belt connection to the small motor, said large or high-speed motor not having sufficient power in itself, owing to the resistance of the rheostat, to impart to such motor any definite speed. As the rheostat-arm begins to move over the rheostat-segments the strength of the large motor is built up, thereby steadily increasing its power and its speed as it approaches nearer and nearer its normal strength and speed. In this case it may be desirable to provide a shunt-field for the small motor adapted to be gradually cut out by the movement of the rheostat-arm as it moves in a direction to decrease the resistance in the high-speed-motor circuits, thus also increasing the speed of the small motor, and hence approaching nearer and nearer the condition of a straight series motor. When the rheostat reaches its extreme limit of movement, the high speed motor has attained its full strength and speed and the slow-speed or auxiliary motor is converted into a straight series motor, and consequently tends to run at a very high speed, but with practically no power, merely keeping up to the high speed at which it is being drawn by its gear or belt connection from the large motor. For example, the small motor in starting may run at four hundred revolutions per minute, driving the large motor at one hundred revolutions per minute, and this in turn driving the hoisting-drum at twelve and one-half revolutions per minute. This would give a speed of travel of one hundred and fifty feet per minute to the car where a hoisting-drum of four feet diameter is employed. At full speed the large or high-speed motor would be running at five hundred revolutions per minute, giving the drum a speed of sixty-two and one-half revolutions per minute and a speed of travel to the car of seven hundred and fifty feet per minute. The small motor would then be running at two thousand revolutions per minute, and in practical operation such small motor being at this time a direct series motor would produce just about enough power to keep up with the large motor, so that it would be neither helping the large motor nor restraining or restricting it. In Fig. 7 I have shown another arrangement embodying the same principle, wherein the hoisting-drum 35 is geared to a shaft upon which both the high-speed motor 36 and the slow-speed motor 37 are mounted. Practically the same conditions obtain in this case as in the construction and arrangement shown in Fig. 6. In Fig. 8 I have shown an arrangement embodying the same principles, wherein the hoisting-drum 38 is geared to the shaft of a motor 39, this motor being provided with two sets of windings, each set provided with an armature 40 41, one set of windings supplying or feeding through one commutator being adapted to impart high speed and the other set of windings supplied through the other commutator being adapted to impart slow speed. In each of these cases the control-circuit connections of the push-button system, as shown in Fig. 9, are applicable.

Other specific arrangements of motors may also be devised for carrying out the principles of the invention, and many variations and changes in the details of construction and arrangement would readily occur to persons skilled in the art and still fall within the spirit and scope of my invention. I do not desire, therefore, to be limited or restricted to the exact details of construction and arrangement shown and described; but, Having now set forth the object and nature of my invention and a construction embodying the principles thereof, what I claim as new and useful and of my own invention, and desire to secure by Letters Patent, is—

1. In an automatic elevator, the combination of a car-hoisting mechanism, a slow-speed motor for actuating said car-hoisting mechanism and a high-speed motor for also actuating said hoisting mechanism, and means for transferring the load from said high-speed motor to said slow-speed motor as the car approaches its stopping-point, as and for the purpose set forth.

2. In an automatic elevator, the combination of a car-hoisting mechanism, a high-speed motor and a slow-speed motor, connections between said motors and hoisting mechanism for operating the latter, and means whereby in starting up the load is transferred from the slow-speed motor to the high-speed motor, as and for the purpose set forth.

3. In an automatic elevator, the combination of a car-hoisting mechanism, a high-speed motor and a slow-speed motor, said motors connected to said hoisting mechanism for actuating the latter, and means whereby in stopping the load is transferred from said high-speed motor to said slow-speed motor, as and for the purpose set forth.

4. In an automatic elevator, the combination with car-hoisting mechanism, a high-speed motor and a slow-speed motor, connections between said motors and hoisting mechanism, and means for gradually transferring the load from one of said motors to the other, as and for the purpose set forth.

5. In an automatic elevator, the combination of car-hoisting mechanism, a high-speed motor and a slow-speed motor, connected to said hoisting mechanism, means for automatically arresting said motors as the car approaches a predetermined stopping-point, and means for automatically shifting the load from the high-speed motor to the slow-speed motor as the car approaches a predetermined stopping-point, as and for the purpose set forth.

6. In an automatic elevator, the combination of a car-hoisting mechanism, a high-speed motor and a slow-speed motor connected to said hoisting mechanism for operating the latter, means for controlling said motors and operating to automatically arrest the same when the car reaches a predetermined stopping-point, and means for transferring the load from the high-speed to the slow-speed motor as the car approaches such predetermined stopping-point, as and for the purpose set forth.

7. In an automatic elevator, the combination with a car-hoisting mechanism, of a high-speed motor and a slow-speed motor, connections between said motors and hoisting mechanism, means for controlling said motors and operating to arrest the same to stop the car at any predetermined stopping-point, and means whereby in starting up the load is transferred from said slow-speed motor to said high-speed motor, as and for the purpose set forth.

8. In an automatic elevator, the combination with car-hoisting mechanism, a slow-speed motor connected thereto and a high-speed motor also connected thereto, means for controlling the circuits of said motors whereby in starting up the work is imposed upon the low-speed motor, means for automatically shifting the load from said low-speed to said high-speed motor to increase the speed of said mechanism, and means for finally cutting out said low-speed motor, as and for the purpose set forth.

9. In an automatic elevator, the combination of car-hoisting mechanism, a high-speed motor connected to said hoisting mechanism, a slow-speed motor detachably connected to said hoisting mechanism, means for controlling the circuits of said motors whereby in starting up the load is imposed upon said low-speed motor, and means for detaching the connections of said motor whereby the load is assumed by said high-speed motor, as and for the purpose set forth.

10. In an automatic elevator, the combination with a high-speed motor, a hoisting-drum mounted on the shaft of said motor, an auxiliary slow-speed motor geared to said shaft, and means whereby in starting up the connections between said shaft and the low-speed motor are detached, as and for the purpose set forth.

11. In an automatic elevator, a high-speed motor, a hoisting-drum mounted on the shaft of said motor, a slow-speed motor, gearing interposed between said slow-speed motor and said shaft, and means whereby in starting said gearing is detached, as and for the purpose set forth.

12. In an automatic elevator, the combination of a high-speed motor, a hoisting-drum connected thereto, an auxiliary or low-speed motor also connected to said drum, means for controlling said circuits whereby in starting up the load is imposed upon said low-speed motor, means for gradually transferring the load to said high-speed motor, and a brake for arresting said slow-speed motor, as and for the purpose set forth.

13. In an automatic elevator, a high-speed motor and a low-speed motor, a car-hoisting mechanism, connections between said motors and said mechanism, means for controlling said motors whereby in starting up the load is carried by said low-speed motor, means for gradually transferring the load from said low-speed motor to said high-speed motor, means for cutting out said low-speed motor when the load is imposed upon said high-speed motor, and means for transferring the load from said high-speed motor to said low-speed motor as the car approaches its stopping-point, as and for the purpose set forth.

14. In an automatic elevator, a high-speed motor, a hoisting-drum mounted upon the shaft thereof, a gear-wheel loosely mounted upon said shaft, an auxiliary or slow-speed motor arranged to drive said gear, and means for detachably connecting said gear to said shaft, as and for the purpose set forth.

15. In an automatic elevator, a high-speed motor, a hoisting-drum mounted upon the shaft thereof, a gear loosely sleeved upon the shaft, a low-speed motor connected to said gear, and a detachable clutch for connecting and disconnecting said gear to said shaft, as and for the purpose set forth.

16. In an automatic elevator, a high-speed motor, a hoisting-drum connected to the shaft of said motor, a gear loosely sleeved upon said shaft, a low-speed motor arranged to drive said gear, means whereby the hoisting-drum starts up under the influence of said low-speed motor, and means for gradually disconnecting said gear from said shaft, whereby the load is gradually imposed upon said high-speed motor to increase the speed of said hoisting-drum, as and for the purpose set forth.

17. In an automatic elevator, a high-speed motor, a hoisting-drum connected to the shaft of said motor, a gear loosely sleeved upon said shaft, a low-speed motor connected to said gear, means for controlling said motors whereby in stopping said gear is gradually connected or coupled to said shaft to transfer the load from said high-speed to said low-speed motor, as and for the purpose set forth.

18. In an automatic elevator, a high-speed motor, a hoisting-drum connected to the shaft of said motor, a gear loosely sleeved upon said shaft, clamping-plates also mounted upon said shaft, said gear being arranged between said clamping-plates, means for shifting one of said clamping-plates to connect or disconnect said gear to said shaft, and an auxiliary or slow-speed motor arranged to drive said gear, as and for the purpose set forth.

19. In an automatic elevator, a high-speed motor, a hoisting-drum connected to the shaft of said motor, clamping-plates mounted on said shaft for rotation therewith, a gear-wheel loosely sleeved upon said shaft between said clamping-plates, means for shifting one of said clamping-plates lengthwise of said shaft whereby said gear may be coupled or uncoupled from said shaft, and a low-speed motor arranged to drive said gear, as and for the purpose set forth.

20. In an automatic elevator, a high-speed motor, a hoisting mechanism connected to the shaft of said motor, clamping-plates mounted on said shaft for rotation therewith, a gear loosely mounted on said shaft and between said plates, a low-speed motor arranged to drive said gear, means normally operating to clamp said plates upon said gear to lock the latter to rotate with said shaft, and electrical devices arranged in the circuit of said high-speed motor for shifting said clamping-plates out of clamping relation, as and for the purpose set forth.

21. In an automatic elevator, a high-speed motor, a hoisting mechanism connected to the shaft of said motor, a gear loosely sleeved upon said shaft, an auxiliary or low-speed motor for driving said gear, means normally operating to clutch or clamp said gear to said shaft, and electrical devices arranged in the circuit of said high-speed motor for releasing said clutch, as and for the purpose set forth.

22. In an automatic elevator, a high-speed motor, a hoisting mechanism connected to the shaft of said motor, a gear loosely sleeved upon said shaft, an auxiliary low-speed motor arranged to drive said gear, a clutch normally operating to connect said gear to rotate with said shaft, a circuit for said high-speed motor, a rheostat arranged in said circuit, and electrical devices also arranged in said circuit and operating to detach said clutch, as and for the purpose set forth.

23. In an automatic elevator, a high-speed motor, a hoisting mechanism connected to the shaft of said motor, a gear loosely sleeved upon said shaft, a low-speed motor for driving said gear, a clamping-plate for clamping said gear to said shaft, a lever connected to said clamping-plate, a spring connected to said lever and operating to hold said clamping-plate in clamping relation, a solenoid arranged in said high-speed motor-circuit and connected to said lever for releasing said clamping-plate, as and for the purpose set forth.

24. In an automatic elevator, a high-speed motor and a low-speed motor, a hoisting mechanism, connections between said motors and hoisting mechanism, means for automatically attaching and detaching the connections of said low-speed motor, a brake for said low-speed motor, means normally operating to set said brake, and electrical devices arranged in the circuit of said low-speed motor for releasing said brake, as and for the purpose set forth.

25. In an automatic elevator, a hoisting mechanism, a high-speed motor connected thereto for driving the same, a low-speed motor detachably connected to said hoisting mechanism for actuating the same, circuits for said motors, a brake for said low-speed motor, means normally operating to set said brake, electrical devices arranged in the circuit of said low-speed motor for releasing said brake, clutch devices normally operating to connect said low-speed motor to said hoisting mechanism, and electrical devices arranged in the circuit of said high-speed motor for releasing said clutch, as and for the purpose set forth.

26. In an automatic elevator, a hoisting mechanism, a high-speed motor connected thereto for operating the same, a low-speed motor, detachable connections between said low-speed motor and said hoisting mechanism, means normally operating to effect the connection of said low-speed motor to said hoisting mechanism, electrical devices arranged in series with the high-speed motor-circuit for detaching said connection, and means also arranged in said circuit for varying the strength of current in said circuit, as and for the purpose set forth.

27. In an automatic elevator, a hoisting mechanism, a high-speed motor and a low-speed motor connected to said hoisting mechanism, circuits for said motors, contacts for controlling said circuits, a movable support for said contacts, and gearing actuated coincidently with the actuation of said hoisting mechanism for moving said contacts, as and for the purpose set forth.

28. In an automatic elevator, hoisting mechanism, a high-speed and a low-speed motor connected to said hoisting mechanism for operating the latter, circuits for said motors, a series of contact-pieces for controlling said circuits, electrical devices for moving said contacts, circuits for said electrical devices, and means controllable from each landing or floor for controlling the circuits of said electrical devices, as and for the purpose set forth.

29. In an automatic elevator, a series of push-buttons arranged at each landing or floor, a circuit controlled by each push-button, a magnet arranged in the circuit of each push-button, the circuit of said magnet adapted to be closed when said push-button is operated, a high-speed and a low-speed motor, hoisting mechanism actuated thereby, circuits for said motors, movable contacts for controlling said motor-circuits, electrical devices for actuating said movable contacts, a circuit for said electrical devices, and means actuated by the energization of said magnet for completing the circuit of said electrical devices, as and for the purpose set forth.

30. In an automatic elevator, a series of push-buttons arranged at each landing or floor, a circuit controlled by each push-button, a magnet included in the push-button circuit, a contact actuated thereby, a high-speed and a low-speed motor, hoisting mechanism actuated by said motors, circuits for said motors, movable contacts for controlling said circuits, electrical devices for actuating said movable contacts, circuits for said electrical devices, said circuits arranged to be controlled by said magnet-contacts, and means actuated by the actuation of said hoisting mechanism for breaking the circuit of said controlling devices when the car arrives at a predetermined stopping-point, as and for the purpose set forth.

31. In an automatic elevator, a hoisting mechanism, a motor for actuating the same, a switch, electrical devices for operating said switch, means for automatically short-circuiting the current around said electric switch-operating means as the car reaches a predetermined stopping-point, as and for the purpose set forth.

32. In an automatic elevator, a high-speed and a low-speed motor, hoisting mechanism, connections between said hoisting mechanism and said motors, a movable contact-support, connections between said contact-support and said hoisting mechanism for securing movement of said contact-support coincident with the actuation of said hoisting mechanism, contacts carried by said support, coöperating contacts associated therewith, circuits for said motors, electrical devices for controlling said circuits, said coöperating contacts included in the circuit of said electrical devices, magnets corresponding to the various landings at which the car is to stop, contacts actuated by said magnets for completing and controlling the circuits of said electrical devices, and means arranged at each floor or landing for controlling the circuits of said magnets, as and for the purpose set forth.

33. In an automatic elevator, a high-speed and a low-speed motor, hoisting mechanism, connections between said motors and hoisting mechanism, a rheostat arranged in the circuit of said high-speed motor, means for actuating said rheostat, a switch arranged in the circuit of said low-speed motor, and means actuated by said rheostat for opening said switch, as and for the purpose set forth.

34. In an automatic elevator, a hoisting mechanism, a high-speed and a low-speed motor connected to said mechanism for actuating the same, a resistance interposed in the circuit of said high-speed motor, means whereby in starting up said resistance is included in said circuit, electrical devices for gradually cutting out said resistances to increase the speed of said high-speed motor, a switch arranged in the circuit of said slow-speed motor, and means actuated by said electrical devices for opening said switch when the resistance in the circuit of said high-speed motor is cut out, as and for the purpose set forth.

35. In an automatic elevator, a hoisting mechanism, a high-speed and a low-speed motor, connections between said motors and hoisting mechanism, a rheostat arranged in the circuit of said high-speed motor, means for gradually cutting out said resistance as the motors are started up, and means for breaking the circuit of the low-speed motor when the resistance of the high-speed-motor circuit is cut out, as and for the purpose set forth.

36. In an automatic elevator, a hoisting mechanism, a high-speed motor and a low-speed motor, connections between said motors and said hoisting mechanism, a rheostat arranged in the circuit of said high-speed motor, a solenoid for controlling said rheostat, means whereby in starting up said solenoid is energized to gradually cut out the resistance of the high-speed-motor circuit, a switch for completing the circuit of the slow-speed motor, and means for opening said switch when the resistance of the high-speed-motor circuit is entirely cut out, as and for the purpose set forth.

37. In an automatic elevator, a hoisting mechanism, a high-speed and a low-speed motor, connections between said motors and said hoisting mechanism, a resistance normally included in series in the circuit of the high-speed motor, means for gradually cutting out said resistance in starting up said motors, means for opening the circuit of said low-speed motor when the resistance of said high-speed-motor circuit is cut out, and a brake for said low-speed motor, electrical devices for releasing said brake, said electrical devices being included in the circuit of said low-speed motor, as and for the purpose set forth.

38. In an automatic elevator, a hoisting mechanism, a low-speed and a high-speed motor, connections between said motors and hoisting mechanism for operating the latter, resistances arranged in series in the circuit of said high-speed motor, electrical devices for gradually cutting out said resistances as the motors start up, a circuit for said electrical devices, means for opening the circuit of said low-speed motor when said resistances are all cut out, a brake for said low-speed motor, a solenoid for releasing said brake, said solenoid being included in the circuit of said low-speed motor, an auxiliary winding for said solenoid, said auxiliary winding being in shunt with the circuit of said resistance-cutting-out devices, as and for the purpose set forth.

39. In an automatic elevator, the combination of a car-hoisting mechanism, a motor for actuating the same, means for controlling the motor whereby the car is automatically arrested at a predestined stopping-point, a brake, and means whereby the brake is partially applied as the car approaches its predetermined stopping-point, as and for the purpose set forth.

40. In an automatic elevator, the combination of a car-hoisting mechanism, a motor for actuating the same, means for controlling the motor whereby the car is automatically arrested at a predetermined stopping-point, a brake, a solenoid for releasing the brake, and means for partially deënergizing the solenoid as the car approaches its predetermined stopping-point, as and for the purpose set forth.

41. In an automatic elevator, the combination of a car-hoisting mechanism, a motor for actuating the same, means for controlling the motor whereby the car is automatically arrested at a predetermined stopping-point, a brake, a solenoid for releasing said brake, a winding for said solenoid in series with the motor-winding, an auxiliary winding for said solenoid in shunt with the motor-winding, and means for breaking the auxiliary or shunt winding of said solenoid as the car approaches its predetermined stopping-point, as and for the purpose set forth.

42. In an automatic elevator, the combination of a car-hoisting mechanism, a motor for actuating the same, means for controlling the motor whereby the car is automatically arrested at a predetermined stopping-point, a brake, and means whereby when the car approaches its predetermined stopping-point the brake is partially applied, the degree of application of said brake varying with the speed of the motor, as and for the purpose set forth.

43. In an automatic elevator, a car-hoisting mechanism, a motor for actuating the same, a speed-controlling switch, an electric device for operating said switch, and means for automatically short-circuiting around said switch-operating means as the car approaches a predetermined stopping-point, as and for the purpose set forth.

In witness whereof I have hereunto set my hand, this 25th day of June, 1901, in the presence of the subscribing witnesses.

HAROLD ROWNTREE.

Witnesses:
   E. C. SEMPLE,
   S. E. DARBY.